( 12 ) United States Patent
Nakashima et al.

(10) Patent No.: US 8,147,959 B2
(45) Date of Patent: Apr. 3, 2012

(54) COLOR-CHANGE LAMINATE

(75) Inventors: Akio Nakashima, Aichi (JP); Atsushi Sasada, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 481 days.

(21) Appl. No.: 12/335,846

(22) Filed: Dec. 16, 2008

(65) Prior Publication Data

US 2009/0155498 A1  Jun. 18, 2009

(30) Foreign Application Priority Data

Dec. 17, 2007 (JP) ................. P2007-324134

(51) Int. Cl.
*B32B 5/16* (2006.01)
(52) U.S. Cl. .............. 428/402; 428/402.24; 428/403; 428/407; 428/317.9; 428/312.8; 428/469
(58) Field of Classification Search .................. None
See application file for complete search history.

(56) References Cited

U.S. PATENT DOCUMENTS

| 5,858,914 | A | * | 1/1999 | Shibahashi et al. | 503/201 |
| 6,228,804 | B1 | * | 5/2001 | Nakashima | 503/226 |
| 6,416,853 | B1 | | 7/2002 | Nakashima et al. | |
| 6,638,620 | B2 | * | 10/2003 | Nakashima et al. | 428/402.2 |
| 2003/0008774 | A1 | | 1/2003 | Yasuda et al. | |

FOREIGN PATENT DOCUMENTS

| JP | 2003 127314 | 5/2003 |
| JP | 2004-243656 | 9/2004 |
| JP | 2007-118198 | 5/2007 |

OTHER PUBLICATIONS

English language Abstract of JP 2003 127314.
English language Abstract of JP 2004-243656.
English language Abstract of JP 2007-118198.

* cited by examiner

*Primary Examiner* — Ling Xu
(74) *Attorney, Agent, or Firm* — Greenblum & Bernstein, PLC

(57) ABSTRACT

A color-change laminate in which a color tone derived from a porous layer is visually perceived in a dry state and a metallic lustrous property is visually perceived in a liquid-absorbed state of the porous layer caused by water application is excellent in luminance and which satisfies both of changing properties and decorative properties in the dry state and in the liquid-absorbed state. A color-change laminate includes a support having a metallic lustrous property and a porous layer provided on the surface of the support. The porous layer includes a low-refractive-index pigment and a transparent metallic lustrous pigment formed by coating a transparent core material with a metal oxide and/or a transparent metallic lustrous pigment having a color-flopping property all fixed onto a binder resin in a dispersed state and is different in transparency in a liquid-absorbed state and in a liquid-unabsorbed state.

9 Claims, 1 Drawing Sheet

COLOR-CHANGE LAMINATE

FIELD OF THE INVENTION

The present invention relates to a color-change laminate. More specifically, it relates to a color-change laminate capable of appearance of a vivid metallic lustrous color through the attachment of a liquid such as water.

BACKGROUND ART

Hitherto, there has been disclosed a laminate wherein a hologram image is visually perceived by providing a porous layer containing a low-refractive-index pigment on a support on which the hologram image has been formed and making the porous layer transparent by its absorption of a liquid (see e.g., Patent Document 1).

The above laminate shows a color tone derived from the low-refractive-index pigment in a dry state and the hologram image is visually perceived through transformation of the low-refractive-index pigment into a transparent mode in a water-absorbed state, but it is difficult to visually perceive a highly luminous hologram image.

Moreover, a laminate comprising a porous layer partially provided on a support having a brilliant property has been disclosed but it is difficult to visually perceive the brilliant property even when the porous layer absorbs water and the laminate is poor in changing properties (see e.g., Patent Document 2).

[Patent Document 1] JP-A-2007-118198
[Patent Document 2] JP-A-2004-243656

SUMMARY OF THE INVENTION

The invention provides a color-change laminate wherein a color tone of a porous layer containing a low-refractive-index pigment can be visually perceived in a dry state (a liquid-unabsorbed state) of the porous layer and a highly luminous metallic lustrous color can be clearly visually perceived in a transparent state (a liquid-absorbed state) through wetting of the porous layer by application of a liquid such as water.

The gist of the invention is a color-change laminate comprising a support having a metallic lustrous property and a porous layer provided on the surface of the support, wherein the porous layer comprises a low-refractive-index pigment and a transparent metallic lustrous pigment formed by coating a transparent core material with a metal oxide and/or a transparent metallic lustrous pigment having a color-flopping property all fixed onto a binder resin in a dispersed state and is different in transparency in a liquid-absorbed state and in a liquid-unabsorbed state.

Furthermore, the requirements of the invention are as follows: the transparent metallic lustrous pigment formed by coating a transparent core material with a metal oxide is a transparent metallic lustrous pigment formed by coating a transparent core material selected from natural mica, synthetic mica, glass, and alumina with a metal oxide and the transparent metallic lustrous pigment having a color-flopping property is selected from cholesteric liquid crystal-type transparent metallic lustrous pigments and transparent metallic lustrous pigments formed by coating silicon oxide with one or two or more metal oxides; the average particle diameter of the transparent metallic lustrous pigment is 1 μm to 300 μm; the average particle diameter of the low-refractive-index pigment is 0.03 μm to 5 μm; the mass ratio of the low-refractive-index pigment to the transparent metallic lustrous pigment(s) in the porous layer is 1:0.2 to 1:3; the thickness of the porous layer is 5 μm to 30 μm; the average thickness of the transparent metallic lustrous pigment is 0.01 μm to 5 μm; the average particle diameter a of the transparent metallic lustrous pigment and the thickness b of the porous layer satisfy the following expression (1):

[Math. 1]

$$a \geq \sqrt{2}b \qquad (1)$$

; the metallic lustrous color of the support is gold and the color of the reflective light of the transparent metallic lustrous pigment formed by coating a transparent core material with a metal oxide is gold; the metallic lustrous color of the support is silver and the color of the reflective light of the transparent metallic lustrous pigment formed by coating a transparent core material with a metal oxide is gold or silver; and the like.

In the invention, since a porous layer containing a transparent metallic lustrous pigment is provided on the surface of a support having a metal luster property, a color tone derived from the porous layer is visually perceived in a dry state and also the metallic luster property visually perceived in a liquid-absorbed state of the porous layer caused by the application of a liquid such as water is excellent in luminance, so that the invention can provide a color-change laminate satisfying both of changing properties and decorative properties in the dry state and in the liquid-absorbed state and possessing applicability to various fields such as a toy field, a decorative field, and a design field.

Figure 1:
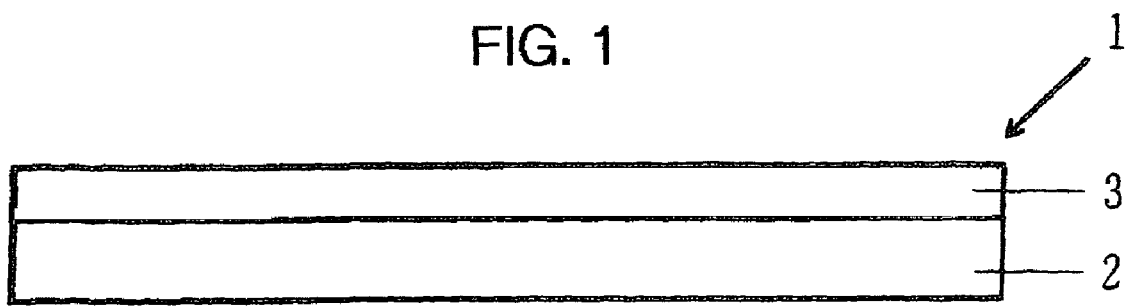
FIG. 1 is a longitudinal cross-sectional view of one Example of the color-change laminate of the invention.

DESCRIPTION OF REFERENCE NUMERALS AND SIGNS 1 color-change laminate
2 support
3 porous layer

DETAILED DESCRIPTION OF THE INVENTION

As the support having a metallic luster property, there may be mentioned metal-deposited films, optical interference films comprising one or two or more oxides and sulfides, iridescent films showing an optical interference phenomenon wherein 100 or more layers composed of two or more polymer are provided as intermediary layers, hologram films, processed articles wherein the above films are provided on the surface, processed articles where metal-deposited foils are provided on the surface, processed articles wherein metallic lustrous pigments such as pearl pigments, aluminum fine powders, and bronze powders are applied or kneaded on the surface, processed articles wherein glass beads having retroreflectivity are homogeneously applied on the surface, and the like.

The porous layer formed on the support is a layer wherein a low-refractive-index pigment and a transparent metallic lustrous pigment formed by coating a transparent core material with a metal oxide and/or a transparent metallic lustrous pigment having a color-flopping property are fixed with a binder resin in a dispersed state.

As the low-refractive-index pigment, there may be mentioned silicic acid and salts thereof, barite powder, barium sulfate, barium carbonate, calcium carbonate, gypsum, clay, talc, alumina white, magnesium carbonate, and the like, which have a refractive index ranging from 1.4 to 1.8 and show a good transparency when they absorb a liquid composition.

As the salts of silicic acid, there may be mentioned aluminum silicate, aluminum potassium silicate, aluminum sodium silicate, aluminum calcium silicate, potassium silicate, calcium silicate, calcium sodium silicate, sodium silicate, magnesium silicate, magnesium potassium silicate, and the like.

As the low-refractive-index pigment, the pigments having an average particle diameter of 0.03 to 5.0 μm are suitably used.

When the average particle diameter of the low-refractive-index pigment is less than 0.03 μm, it becomes difficult to sufficiently shield the metallic lustrous color of the support in a dry state of the porous layer and also, since the difference in color tones in a dry state and in a liquid-absorbed state becomes small, the profit of color change is apt to be impaired. On the other hand, when the average particle diameter of the low-refractive-index pigment exceeds 5.0 μm, the transparent metallic lustrous pigment and the low-refractive-index pigment come to contact with each other in the porous layer and thereby, it becomes difficult to achieve uniform orientation of the transparent metallic lustrous pigment, so that translucency in the liquid-absorbed state is impaired and thus it becomes difficult to express a good metallic lustrous color.

Moreover, two or more kinds of the pigments low in refractive index may be used in combination.

As a low-refractive-index pigment suitably used, silicic acid may be mentioned.

The silicic acid may be silicic acid produced by a dry process but silicic acid produced by a wet process (hereinafter referred to as wet-process silicic acid) is particularly effective and satisfies requirements for practical use.

The following will explain this point.

Silicic acid is produced as non-crystalline amorphous silicic acid and, depending on the production process thereof, is roughly classified into silicic acid through dry-process where a vapor-phase reaction such as pyrolysis of a silicon halide such as silicon tetrachloride (hereinafter referred to as dry-process silicic acid) and silicic acid through wet-process where a liquid-phase reaction such as decomposition of sodium silicate or the like with an acid. However, in order to realize the function as the porous layer intended by the invention, the wet-process silicic acid is most suitable.

That is, the dry-process silicic acid and the wet-process silicic acid are different in structure from each other. In the dry-process silicic acid, a three-dimensional structure where silicic acid molecules are closely bonded to one another, while the wet-process silicic acid has a so-called two-dimensional structural moiety where silicic acid molecules are condensed to form a long molecular alignment.

Therefore, since the molecular structure becomes coarse as compared with the above dry-process silicic acid, in the case where the wet-process silicic acid is employed as a porous layer, the layer is excellent in diffused light-reflection properties in a dry state as compared with the system using the dry-process silicic acid and hence it is surmised that shielding ability increases in an ordinary state.

Moreover, in the porous layer of the invention, water is absorbed therein. The wet-process silicic acid has larger amount of hydroxyl groups present as silanol groups as compared with the dry-process silicic acid and the wet-process silicic acid has a large degree of hydrophilicity, so that it is suitably employed.

In this connection, in order to adjust the shielding ability in the ordinary state and the transparency in the liquid-absorbed state of the porous layer, the other widely used low-refractive-index pigment can be also used in combination with the wet-process silicic acid.

With the low-refractive-index pigment in the porous layer, depending on the properties such as particle diameter, specific surface area, and oil-absorbing amount, the amount to be applied is preferably 1 g/m$^2$ to 30 g/m$^2$, more preferably 5 g/m$^2$ to 20 g/m$^2$ in order to satisfy both the shielding ability in the ordinary state and the transparency in the liquid-absorbed state.

When the amount is less than 1 g/m$^2$, it is difficult to obtain sufficient shielding ability in the ordinary state, while when the amount exceeds 30 g/m$^2$, it is difficult to obtain sufficient transparency in the liquid-absorbed state.

As the transparent metallic lustrous pigment, there may be mentioned those each using natural mica, synthetic mica, glass, or alumina as a core material, whose surface is coated with an oxide of a metal such as zirconium, chromium, vanadium, or iron.

As the transparent metallic lustrous pigment using natural mica as a core material, there may be exemplified trade name "Iriodin" item Nos. 100 (10 to 60 μm: silver), 103 (10 to 50 μm: silver), 111 (15 μm: silver), 120 (5 to 20 μm: silver), 151 (5 to 100 μm: silver), 153 (30 to 100 μm: silver), 163 (40 to 200 μm: silver), 201 (5 to 50 μm: gold), 205 (10 to 60 μm: gold), 249 (10 to 100 μm: gold), 215 (10 to 60 μm: red purple), 217 (10 to 60 μm: bronze), 219 (10 to 60 μm: purple), 225 (10 to 60 μm: blue), 235 to 60 μm: green), 300 (10 to 60 μm: gold), 302 (5 to 20 μm: gold), 320 (10 to 60 μm: gold), 351 (5 to 100 μm: gold), 355 (30 to 100 μm: gold), 500 (10 to 60 μm: gold), (10 to 60 μm: red gold), 520 (5 to 20 μm: gold), 530 to 100 μm: gold) manufactured by Merck Ltd., trade name "Marlin" item Nos. magnapearl 3000 (2 to 10 μm: silver), satin white 9130F (4 to 32 μm: silver), super white 9020C (6 to 48 μm: silver), magnapearl 1000 (8 to 48 μm: silver), sparkle 9110P (10 to 110 μm: silver), super sparkle 9110S (10 to 150 μm: silver), highlight super gold 9230Z (6 to 48 μm: gold), highlight super red 9430Z (6 to 48 μm: red), highlight super green 9830Z (6 to 48 μm: green), highlight super orange 9330Z (6 to 48 μm: orange), highlight super violet 9530Z (6 to 48 μm: purple), highlight super blue 9630Z (6 to 48 μm: blue) manufactured by Engelhard, trade name "Lumina" item Nos. gold (10 to 48 μm: gold), red (10 to 48 μm: red), red-blue (10 to 48 μm: purple), aqua-blue (10 to 48 μm: blue), turquoise (10 to 48 μm: blue green), green (10 to 48 μm: green) manufactured by Engelhard.

In this connection, those described in parentheses in the item Nos. represent average particle diameters and color tones of the pigments.

The average particle diameter is an average particle diameter determined by a laser diffraction method, which is a particle diameter corresponding to 50% of cumulative distribution as a median diameter on the basis of volume.

The average thickness of the transparent metallic lustrous pigment is 0.01 to 1.0 μm.

The transparent metallic lustrous pigment using synthetic mica as a core material has a small content of impurities and metal ions showing coloring tendency, such as iron and is excellent in transparency as compared with the system using natural mica as a core material.

The synthetic mica is formed by coating with a metal oxide composed of titanium oxide and/or iron oxide as main component(s) and shows a metallic lustrous color such as gold, silver, or a metallic color depending on the coating rate of the metal oxide.

One example of the synthetic mica, $KMg_3(AlSi_3O_{10})F_2$ may be mentioned. In this connection, the shape of the synthetic mica is not particularly limited but flat shaped one and scale-like one may be exemplified.

As the transparent metallic lustrous pigment formed by coating the surface of the synthetic mica with a metal oxide, there may be exemplified trade name "Altimica" item Nos. SB-100 (5 to 30 μm: silver), SD-100 (10 to 60 μm: silver), SE-100 (15 to 100 μm: silver), SF-100 (44 to 150 μm: silver), SH-100 (150 to 600 μm: silver), YB-100 (5 to 30 μm: gold), YD-100 (10 to 60 μm: gold), YE-100 (15 to 100 μm: gold), YF-100 (44 to 150 μm: gold), RB-100 (5 to 300 μm: metallic red), RD-100 (10 to 60 μm: metallic red), RE-100 (15 to 100 μm: metallic red), RF-100 (44 to 150 μm: metallic red), RBB-100 (5 to 30 μm: metallic purple), RBD-100 (10 to 60 μm: metallic purple), RBE-100 (15 to 100 μm: metallic purple), RBF-100 (44 to 150 μm: metallic purple), VB-100 (5 to 30 μm: metallic violet), VD-100 (10 to 60 μm: metallic violet), VE-100 (15 to 100 μm: metallic violet), VF-100 (44 to 150 μm: metallic violet), BB-100 (5 to 30 μm: metallic blue), BD-100 (10 to 60 μm: metallic blue), BE-100 (15 to 100 μm: metallic blue), BF-100 (44 to 150 μm: metallic blue), GB-100 (5 to 30 μm: metallic green), GD-100 (10 to 60 μm: metallic green), GE-100 (15 to 100 μm: metallic green), and GF-100 (44 to 150 μm: metallic green) manufactured by Nihon Koken Kogyo Co., Ltd.

In this connection, those described in parentheses in the item Nos. represent average particle diameters and color tones and the average thickness is 0.01 to 1.0 μm.

The transparent metallic lustrous pigment using glass as a core material is formed by coating the surface of flat glass pieces with a metal oxide composed of titanium oxide and/or iron oxide as main component(s), has an average thickness of 0.1 to 5 μm, and shows a metallic lustrous color such as gold, silver, or metallic color depending on the coating rate of the metal oxide.

As the transparent metallic lustrous pigment formed by coating the surface of the glass pieces with a metal oxide, there may be exemplified trade name "Metashine" item Nos.: RCFSX-5450TS (6041) [average thickness 5±2 μm, average particle size 450±145 μm: gold], RCFSX-5200TS (6042) [average thickness 5±2 μm, average particle size 200±70 μm: silver], RCFSX-5140TS (6043) [average thickness 5±2 μm, average particle size 140±45 μm: silver], RCFSX-5080TS (6044) [average thickness 5±2 μm, average particle size 80±30 μm: silver], RCFSX-2080TS (6046) [average thickness 2±1 μm, average particle size 80±30 μm: silver], RCFSX-K120TS (6043) [average thickness 20±5 μm, average particle size 120±20 μm: silver], RCFSX-5090RC (8052) [average thickness 5±2 μm, average particle size 90±30 μm: gold], RCFSX-5090RC (8053) [average thickness 5±2 μm, average particle size 90±30 μm: metallic green], RCFSX-5090RC (8069) [average thickness 5±2 μm, average particle size 90±30 μm: metallic blue], RCFSX-5090RC (8070) [average thickness 5±2 μm, average particle size 90±30 μm: metallic purple], and RCFSX-5090RC (8071) [average thickness 5±2 μm, average particle size 90±30 μm: metallic red] manufactured by Nippon Sheet Glass Co., Ltd.

Moreover, a double layer-coated transparent metallic lustrous pigment where the surface of the glass pieces are coated with silicon dioxide and further coated with titanium oxide may be also employed.

Since the silicon dioxide has higher hardness and more excellent acid resistance than glass has, a state of being hardly cracked can be maintained even when the thickness of the glass pieces is thinned. Accordingly, mass per reflection area can be reduced and also it becomes possible to improve light transmittance of the pigment.

As the pigment, there may be exemplified trade name "Miraval" item Nos.: 5311 Scenic White (10 to 100 μm: silver), 5411 Magic White (20 to 200 μm: silver), 5420 Magic Gold (20 to 200 μm: gold), 5421 Magic Copper (20 to 200 μm: copper), 5422 Magic Red (20 to 200 μm: bronze), 5423 Magic Lilac (20 to 200 μm: purple), 5424 Magic Blue (20 to 200 μm: blue), 5425 Magic Turquoise (20 to 200 μm: blue green), and 5426 Magic Green (20 to 200 μm: green) manufactured by Merck Ltd.

In this connection, those described in parentheses in the item Nos. represent average particle diameters and color tones and the average thickness is 0.1 to 1.0 μm.

The transparent metallic lustrous pigment using alumina as a core material is formed by coating the surface of a flake-shaped aluminum oxide with a metal oxide composed of titanium oxide and/or iron oxide as main component(s) and shows metallic lustrous color such as gold, silver, or a metallic color depending on the coating rate of the metal oxide.

As the transparent metallic lustrous pigment formed by coating the surface of the alumina with a metal oxide, there may be exemplified trade name "Silalic" item Nos.: T60-10WNT (10 to 30 μp: silver), T60-20WNT (10 to 30 μm: gold), T60-21WNT (10 to 30 μm: red), F60-50WNT (10 to 30 μm: copper), F60-51WNT (10 to 30 μm: red), and T50-10 (10 to 30 μm: silver) manufactured by Merck Ltd.

In this connection, those described in parentheses in the item Nos. represent average particle diameters and color tones and the average thickness is 0.1 to 1.0 μm.

As the transparent metallic lustrous pigment having a color flopping property, there may be mentioned cholesteric liquid crystal-type transparent metallic lustrous pigments and transparent metallic lustrous pigments formed by coating silicon oxide with one or two or more kinds of metal oxides.

The cholesteric liquid crystal-type transparent metallic lustrous pigment will be explained.

A liquid crystalline polymer to be used as the cholesteric liquid crystal-type transparent metallic lustrous pigment has properties that light reflects in only a part of the range of an incident light having a wide spectrum range by a light interference effect and light transmits in the range other than the above range. The range of the reflection spectrum is determined by the pitch width of a helical polymer and the refractive index of the material, and the range of the reflection spectrum is divided into left-helically and right-helically polarized light components. At that time, depending on the rotation direction of the helix, it is possible to reflect one component and transmit the other. Thereby, the cholesteric liquid crystal-type transparent metallic lustrous pigment has transmitting and reflecting properties over the whole spectrum range, i.e., an excellent metallic luster and a color flopping property of changing a color tone depending on the viewing point.

Moreover, the cholesteric liquid crystal-type transparent metallic lustrous pigment has a brilliant property and also transparency.

As the cholesteric liquid crystal-type transparent metallic lustrous pigment, specifically, materials each based on a siloxane skeleton having a mesogen at the side chain may be exemplified.

As the cholesteric liquid crystal-type transparent metallic lustrous pigment, there may be specifically mentioned trade name "Helicone HC" item Nos.: Sapphire (30 μm: blue→dark color), Scarabeus (30 μm: green→blue), Jade (30 μm: gold→green blue), Maple (30 μm: bronze→green), and the like manufactured by Wacker Chemie.

In this connection, those described in parentheses in the item Nos. represent average particle diameters and color tones and the average thickness is 5 μm.

Among the transparent metallic lustrous pigments having the color flopping property, the transparent metallic lustrous pigment formed by coating silicon oxide with one or two or more kinds of metal oxides has a light transmitting property and also has a color flopping property capable of expressing various colors depending on the angle at which the pigment is visually observed and the angle at which light enters by a light interference effect and an excellent metallic lustrous property.

Moreover, in the case where silicon oxide is coated with two or more kinds of metal oxides in multi layers, the color flopping property and metallic lustrous property can be more effectively imparted by using metal oxides different in light reflectivity.

As the metal oxides, there may be mentioned tin oxide, titanium oxide, iron oxide, and the like.

As the metallic lustrous pigment, there may be exemplified trade names: Colorstream T10-01 Viola Fantasy (20 μm: purple→silver→green→blue), Colorstream T10-02 Artic Fire (20 μm: green blue→silver→red→gold), Colorstream T10-03 Tropic Sunrise (20 μm: green→silver→red→orange), and the like manufactured by Merck Ltd.

In this connection, those described in parentheses in the item Nos. represent average particle diameters and color tones and the average thickness is 0.01 to 1.0 μm.

The average particle diameter of the transparent metallic lustrous pigment or the transparent metallic lustrous pigment having a color flopping property is not particularly limited but the average particle diameter is suitably in the range of 1 μm to 300 μm, preferably 10 μm to 200 μm.

When the average particle diameter of the transparent metallic lustrous pigment is less than 1 μm, the orientation of the transparent metallic lustrous pigment in the porous layer becomes heterogeneous and sufficient brilliant property and color flopping property are difficult to obtain.

On the other hand, when the average particle diameter exceeds 300 μm, the transparent metallic lustrous pigment is difficult to disperse in a homogeneous state and is localized in the porous layer or the thickness of the porous layer becomes heterogeneous and the color change in the liquid-absorbed state and in the liquid-unabsorbed state is apt to be unclear. Furthermore, when the average particle diameter exceeds 300 μm, printing suitability for screen printing and gravure printing is apt to be impaired.

The mass ratio of the low-refractive-index pigment to the transparent metallic lustrous pigment in the porous layer is preferably 1:0.2 to 1:3.

In the case where the transparent metallic lustrous pigment is less than 0.2 relative to 1 of the low-refractive-index pigment, good metallic lustrous property or color flopping property are difficult to express in the liquid absorption of the porous layer. On the other hand, when the transparent metallic lustrous pigment exceeds 3 relative to 1 of the low-refractive-index pigment, it becomes difficult to sufficiently shield the underlying metallic lustrous color at the time of liquid unabsorption in the porous layer, difference between color tones at the time of liquid unabsorption and at the time of liquid absorption decreases, and the profit of color change is easily impaired.

The thickness of the porous layer is preferably 5 μm to 30 μm, more preferably 10 μm to 20 μm. When the thickness of the porous layer is less than 5 μm, it becomes difficult to sufficiently shield the metallic lustrous color of the underlying support at the time of liquid unabsorption in the porous layer, difference between color tones at the liquid-unabsorbed time and at the liquid-absorbed time decreases, and the profit of color change is easily impaired. On the other hand, when the thickness of the porous layer exceeds 30 μm, the translucency of the porous layer at the liquid-absorbed time is apt to be impaired and it becomes difficult to visually perceive the metallic lustrous color derived from the support. Moreover, the orientation property of the transparent metallic lustrous pigment in the porous layer is apt to become heterogeneous and it becomes difficult to express good metallic lustrous color and color flopping property at the time of liquid absorption.

The average thickness of the transparent metallic lustrous pigment formed by coating the transparent core material with a metal oxide or the transparent metallic lustrous pigment having a color flopping property is preferably 0.01 μm to 5 μm. When the average thickness is less than 0.01 μm, the transparent metallic lustrous pigment is apt to be impaired by the contact with the low-refractive-index pigment contained in the porous layer, so that it is difficult to obtain the desired metallic lustrous property. On the other hand, when the average thickness of the transparent metallic lustrous pigment exceeds 5 μm, the light-shielding property in the liquid-unabsorbed state decreases, it becomes difficult to shield the metallic lustrous color derived from the support, difference between color tones in the liquid-unabsorbed state and in the liquid-absorbed state decreases, and the profit of color change is apt to be impaired.

The average particle diameter a of the transparent metallic lustrous pigment or the transparent metallic lustrous pigment having a color flopping property and the thickness b of the porous layer preferably satisfy the following expression (1).

[Math. 2]

$$a \geq \sqrt{2}b \qquad (1)$$

When the average particle diameter a of the transparent metallic lustrous pigment is less than √2b, the transparent metallic lustrous pigment in the porous layer is frequently present at an angle larger than 45° toward the support and thus it is difficult to visually perceive the metallic lustrous color by light scattering.

In order to obtain a good brilliant effect, it is necessary that the transparent metallic lustrous pigment in the porous layer is homogeneously present in a parallel direction toward the support and is preferably present at an angle of 45° or less toward the support. Therefore, in the average particle diameter a of the transparent metallic lustrous pigment and the thickness b of the porous layer, the satisfaction of the requirement of the expression (1) means that the transparent metallic lustrous pigment shows a good orientation property in the porous layer.

The low-refractive-index pigment and the transparent metallic lustrous pigment are dispersed in a vehicle containing a binder resin as a binder and, after applied on the support, volatile matter is removed to dryness to form a porous layer.

As the binder resin, there may be mentioned urethane-based resins, nylon resins, vinyl acetate resins, acrylic ester resins, acrylic ester copolymer resins, acrylic polyol resins, vinyl chloride-vinyl acetate copolymer resins, maleic acid resins, polyester resins, styrene resins, styrene copolymer resins, polyethylene resins, polycarbonate resins, epoxy resins, styrene-butadiene copolymer resins, acrylonitrile-butadiene copolymer resins, methyl methacrylate-butadiene copolymer resins, butadiene resins, chloroprene resins, melamine resins, and emulsions of the above resins, casein, starch, cellulose derivatives, polyvinyl alcohol, urea resins, phenol resins, and the like.

The mixing ratio of the low-refractive-index pigment to the binder resin depends on the kind and shape of the silicic acid but the solid matter content of the binder resin is preferably 0.5 to 2 parts by mass, more preferably 0.8 to 1.5 parts by mass, relative to 1 part by mass of the low-refractive-index pigment. When the solid matter content of the binder resin is less than 0.5 part by mass relative to 1 part by mass of the low-refractive-index pigment, it is difficult to obtain practical film strength of the porous layer, while when the solid matter content exceeds 2 parts by mass, permeability of water into the inside of the porous layer becomes worse.

Since the porous layer has a small mixing ratio of the binder resin relative to a colorant as compared with common coated films, it is difficult to obtain a sufficient film strength. In order to enhance abrasion resistance, it is effective to use nylon resins or urethane-based resins among the above binder resins.

As the urethane-based resins, there are polyester-based urethane resins, polycarbonate-based urethane resins, polyether-based urethane resins, and the like and they may be used as a combination of two or more thereof. Moreover, there may be used a urethane-based emulsion resin where the above resin is emulsified in water and a colloid-dispersed type (ionomer type) urethane resin where a urethane resin (urethane ionomer) is self-emulsified in water to form a solution or dispersion without requiring any emulsifier by the action of ionic groups of the resin (ionomer) itself.

With regard to the above urethane resins, any of aqueous urethane-based resins or oily urethane-based resins can be used but, in the invention, aqueous urethane-based resins, particularly urethane-based emulsion resins and colloid-dispersed type urethane-based resins are suitably employed.

The above urethane-based resins may be used singly but, depending on the kind of the support and the performance required for the film, the other binder resin can be used in combination. In the case where a binder resin other than the urethane-based resins is used in combination, in order to obtain practical film strength, the urethane-based resin is preferably incorporated in the binder resin of the porous layer in an amount of 30% or more as a solid matter content mass ratio. In the binder resin, the film strength can be further improved by crosslinking a crosslinkable resin with adding any crosslinking agent.

Among the above binder resins, there are resins different in affinity to water. A time for permeation into the porous layer, a degree of permeation, and speed of drying after permeation can be adjusted by combining them. Furthermore, the adjustment can be controlled by suitably adding a dispersant.

The porous layer can be formed by known means including printing means such as screen printing, offset printing, gravure printing, coater, Tampo printing, and transcription, brush coating, spray coating, electrostatic coating, electrodeposition coating, flow coating, roller coating, dip coating, and the like.

Moreover, coloring of the porous layer in a dry state can be achieved by adding a common colored pigment into the porous layer but the colored pigment to be applied is preferably a highly transparent one and a colored pigment having an average particle diameter of 0.01 μm to 1.0 μm is suitable.

Since the porous layer in a dry state can be adjusted to any color tone by the above constitution, decorative properties can be further enhanced. Also, since the color tone as a mixed color of the color tone derived from the pigment in the above layer and the color tone derived from the underlying support having a metallic lustrous property is visually perceived, variation of color change can be broadened and thus the laminate is excellent in applicability to various uses.

In this connection, if necessary, it is possible to provide a colored image on the porous layer to form a constitution showing complex mode changes or to provide a colored image between the support and the porous layer.

The colored image provided between the support and the porous layer can be visually conceived through the porous layer when the layer is in a water-absorbed state and thus a visual effect can be enhanced.

The following will explain the correlation between the metallic lustrous color of the support and the color tone of reflective light of the transparent metallic lustrous pigment.

The metallic lustrous color of the support and the color tone of reflective light of the transparent metallic lustrous pigment may be any one so far as the porous layer shows a good brilliant property in a liquid-absorbed state and the combination is not particularly limited. However, as a result of studies on preferable embodiments for the combinations of the metallic lustrous color of the support and the color tone of reflective light of the transparent metallic lustrous pigment, combinations capable of obtaining a higher brilliant property can be found and hence will be described below.

In order to visually conceive a good gold metal lustrous color in a liquid-absorbed state of the porous layer, it is preferred that the support is a gold color and the reflective light of the transparent metallic lustrous pigment is a gold color. Moreover, in order to visually conceive a good silver metallic lustrous color in a liquid-absorbed state of the porous layer, it is preferred that the support is a silver color and the reflective light of the transparent metallic lustrous pigment is a gold or silver color or a mixed color of gold and silver colors.

Furthermore, in the case where the support is a metallic color excluding gold and silver colors, e.g., a blue metallic color, a green metallic color, a red metallic color, a purple metallic color, or the like, it is preferred that the reflective light of the transparent metallic lustrous pigment is a metallic lustrous color which has not a relation of complementary color to the metallic lustrous color of the support. This is because the metallic lustrous color visually conceived becomes a white indistinct color tone and no vivid brilliant color can be obtained when the metallic lustrous color of the support and the color tone of reflective light of the transparent metallic lustrous pigment have a relation of complementary color to each other.

As a means for attaching a liquid such as water to the above color-change laminate, in addition to direct dipping thereof in a liquid such as water or wetting of a hand or finger with a liquid such as water and subsequent contact therewith, an attaching tool for a liquid such as water can be also applied.

As the attaching tool, there may be mentioned an apparatus for spraying a liquid, such as a water gun or a sprayer, a writing or applying tool having a point of a writing brush, a fibrous pen body, or the like at the end part, a writing or applying tool comprising a container in which a liquid is contained and a fibrous body or brush through which the liquid in the container is conducted, a stamp, and the like.

In this connection, it is possible to constitute a color-change laminate set in combination of the above attaching tool with the color-change laminate.

As the liquid, water is suitably used in view of safety and cost. However, the liquid is not limited thereto and there may be used an organic solvent selected from alcohols, ethers, acetals, esters, glycols, ketones, aliphatic hydrocarbons or a mixture of water and an organic solvent.

Among the above organic solvent, liquid paraffin, a vegetable oil, an aliphatic ester such as an adipic acid ester, a glycol such as propylene glycol or glycerin is suitably used since they are excellent in safety as compared with the other organic solvents.

Furthermore, long-term storage of the image formed in the color-change laminate can be satisfied by the use of a solid matter having a refractive index of 1.3 to 1.8 dissolved and/or dispersed in the liquid.

The solid matter having a refractive index of 1.3 to 1.8 is a substance showing a solid state at 20° C. The matter remains in the porous layer even when the medium is dried and allows the image to be visually perceived permanently. Therefore, the solid matter having a refractive index of 1.3 to 1.8, preferably 1.4 to 1.7 is used.

The solid matter is not particularly limited so far as it is an organic or inorganic substance having a refractive index ranging 1.3 to 1.8 but, as organic substances, there may be exemplified synthetic resins or oligomers such as ethylene-vinyl acetate copolymer resins, acrylic resins, polyethylene glycol, polypropylene glycol, and polyvinyl pyrrolidone, natural products or semi-synthetic resins such as cellulose acetate and starch derivatives, solid oils and fats such as higher fatty acids, higher alcohols, fatty acid esters, oxy acid esters, polyhydric alcohol fatty acid esters, and alkyl glyceryl ether fatty acid esters, surfactants such as glycerin fatty acid esters, polysaccharides and glycosides such as starch sugars and dextran, vitamins such as vitamin A and lipoamides, amino acids, and the like. In addition, as inorganic substances, there may be exemplified calcium chloride, sodium chloride, sodium silicate, bleaching powder, disodium carbonate, soda lime, aluminum silicate, aluminum sulfate, ammonium alum, ammonium sulfate, calcium carbonate, colloidal silica, and the like.

EXAMPLES

The following will describe Examples but the invention is not limited to the Examples. The part(s) in Examples represents part(s) by mass.

Example 1

See FIG. 1

Using a screen printing ink formed by homogeneously mixing 10 parts of a bronze powder and 10 parts of a colored pearl pigment whose reflective light is a gold color in 80 parts of a binder resin containing an acrylic emulsion as a main component, whole-area solid printing was performed on a white synthetic paper having a thickness of 200 μm by means of a screen plate of 180 mesh to obtain a support 2 having a gold metallic lustrous color.

A printing ink was obtained by homogeneously mixing and stirring 10 parts of a transparent metallic lustrous pigment formed by coating the surface of natural mica with titanium oxide [trade name: Iriodin 240, manufactured by Merck Japan, Ltd., average particle diameter: 40 μm, average thickness: 0.05 μm, reflective light: gold], 10 parts of wet-process silicic acid [trade name: Nipseal E-200, Nihon Silica Kogyo K.K., average particle diameter: 3.0 μm], 30 parts of a urethane emulsion [trade name: Hydran HW-930, manufactured by Dainippon Ink And Chemicals, Incorporated, solid matter content: 50%], 40 parts of water, 0.5 part of a silicone-based defoaming agent, 3 parts of a thickening agent for aqueous ink, 1 part of ethylene glycol, and 3 parts of an isocyanate-based crosslinking agent.

Using the above printing ink, whole-area solid printing was performed on the above support by means of a screen plate of 150 mesh to provide a porous layer 3 having a thickness of 15 μm, thereby a color-change laminate 1 being obtained.

On the color-change laminate, a white state derived from the porous layer is visually perceived at a dry state.

When water is attached to the porous layer, the porous layer is made transparent and a highly luminous glittering gold metallic lustrous color is visually perceived, which is derived from the gold color of the support and the reflective light of the transparent metallic lustrous pigment in the porous layer.

The gold metallic lustrous color was visually perceived in the liquid-absorbed state of the porous layer but the color returned to the original white state by drying. The above mode change could be repeatedly performed.

Example 2

An aluminum foil colored with a blue dye was wholly transcribed onto a white paper having a thickness of 300 μm to obtain a support having a blue metallic color.

A printing ink was obtained by homogeneously mixing and stirring 10 parts of a transparent metallic lustrous pigment obtained by coating the surface of alumina flakes with titanium oxide [trade name: Silalic T60-23WNT Galaxy Blue, manufactured by Merck Japan, Ltd., average particle diameter: 18 μm, average thickness: 0.1 μm, reflective light: blue], 15 parts of wet-process silicic acid [trade name: Nipseal E-200, Nihon Silica Kogyo K.K., average particle diameter: 3.0 μm], 30 parts of a urethane emulsion [trade name: Hydran HW-930, manufactured by Dainippon Ink And Chemicals, Incorporated, solid matter content: 50%], 40 parts of water, 0.5 part of a silicone-based defoaming agent, 3 parts of a thickening agent for aqueous ink, 1 part of ethylene glycol, and 3 parts of an isocyanate-based crosslinking agent.

Using the above printing ink, whole-area solid printing was performed on the above support by means of a screen plate of 180 mesh to provide a porous layer having a thickness of 13 μm, thereby a color-change laminate being obtained.

On the color-change laminate, a white state derived from the porous layer is visually perceived at a dry state.

When water is attached to the porous layer, the porous layer is made transparent and a highly luminous glittering blue metallic color is visually perceived, which is derived from the blue metallic color of the support and the reflective light of the transparent metallic lustrous pigment in the porous layer.

The blue metallic color was visually perceived in the liquid-absorbed state of the porous layer but the color returned to the original white state by drying. The above mode change could be repeatedly performed.

Example 3

An aluminum-deposited layer was formed on the surface of a transparent polyvinyl chloride sheet having a thickness of 50 μm to obtain a support having a silver metallic luster.

A printing ink was obtained by homogeneously mixing and stirring 10 parts of a transparent metallic lustrous pigment obtained by coating the surface of alumina flakes with titanium oxide [trade name: Silalic T60-10WNT Crystal Silver, manufactured by Merck Japan, Ltd., average particle diameter: 18 μm, average thickness: 0.1 μm, reflective light: silver], 5 parts of wet-process silicic acid [trade name: Nipseal E-200, Nihon Silica Kogyo K.K., average particle diameter: 3.0 μm], 15 parts of a urethane emulsion [trade name: Hydran HW-930, manufactured by Dainippon Ink And Chemicals, Incorporated, solid matter content: 50%], 30 parts of water, 0.5 part of a silicone-based defoaming agent, 3 parts of a thickening agent for aqueous ink, 1 part of ethylene glycol, and 3 parts of an isocyanate-based crosslinking agent.

Using the above printing ink, whole-area solid printing was performed on the above support by means of a screen plate of 180 mesh to provide a porous layer having a thickness of 10 µm, thereby a color-change laminate being obtained.

On the color-change laminate, a white state derived from the porous layer is visually perceived at a dry state.

When water is attached to the porous layer, the porous layer is made transparent and a highly luminous glittering silver metallic lustrous color is visually perceived, which is derived from the silver color of the support and the reflective light of the transparent metallic lustrous pigment in the porous layer.

The silver color was visually perceived in the liquid-absorbed state of the porous layer but the color returned to the original white state by drying. The above mode change could be repeatedly performed.

Example 4

An aluminum foil colored with a yellow dye was wholly transcribed onto a white paper having a thickness of 500 µm to obtain a support having a gold metallic lustrous color.

A printing ink was obtained by homogeneously mixing and stirring 30 parts of a transparent metallic lustrous pigment obtained by coating the surface of natural mica with titanium oxide [trade name: Iriodin 249, manufactured by Merck Japan, Ltd., average particle diameter: 40 µm, average thickness: 0.1 µm, reflective light: gold], 15 parts of wet-process silicic acid [trade name: Nipseal E-200, Nihon Silica Kogyo K.K., average particle diameter: 3.0 µm], 30 parts of a urethane emulsion [trade name: Hydran HW-930, manufactured by Dainippon Ink And Chemicals, Incorporated, solid matter content: 50%], 40 parts of water, 0.5 part of a silicone-based defoaming agent, 3 parts of a thickening agent for aqueous ink, 1 part of ethylene glycol, and 3 parts of an isocyanate-based crosslinking agent.

Using the above printing ink, whole-area solid printing was performed on the above support by means of a screen plate of 120 mesh to provide a porous layer having a thickness of 18 µm, thereby a color-change laminate being obtained.

On the color-change laminate, a white state derived from the porous layer is visually perceived at a dry state.

When water is attached to the porous layer, the porous layer is made transparent and a highly luminous glittering gold metallic color is visually perceived, which is derived from the gold color of the support and the reflective light of the transparent metallic lustrous pigment in the porous layer.

The gold color was visually perceived in the liquid-absorbed state of the porous layer but the color returned to the original white state by drying. The above mode change could be repeatedly performed.

Example 5

An aluminum foil was deposited on a spherical resin molded article and a green transparent dye was applied thereto to obtain a support having a green metallic color.

A spraying ink was obtained by homogeneously mixing and stirring 2 parts of a transparent metallic lustrous pigment obtained by coating the surface of alumina flakes with titanium oxide [trade name: Silalic T60-25WNT Cosmetic Turquoise, manufactured by Merck Japan, Ltd., average particle diameter: 20 µm, average thickness: 0.1 µm, reflective light: blue green], 10 parts of wet-process silicic acid [trade name: Nipseal E-1011, Nihon Silica Kogyo K.K., average particle diameter: 1.5 µm], 50 parts of a urethane emulsion [trade name: Permarine UA-150, manufactured by Sanyo Chemical Industries, Ltd., solid matter content: 30%], 30 parts of water, 10 parts of isopropyl alcohol, 0.5 part of a silicone-based defoaming agent, 3.0 parts of a leveling agent, and 2 parts of an isocyanate-based crosslinking agent.

Using the above spraying ink, a porous layer having a thickness of 10 µm was provided on the above support to obtain a color-change laminate.

On the color-change laminate, a white state derived from the porous layer is visually perceived at a dry state.

When water is attached to the porous layer, the porous layer is made transparent and a highly luminous glittering green metallic color is visually perceived, which is derived from the green metallic color of the support and the reflective light of the transparent metallic lustrous pigment in the porous layer.

The green metallic color was visually perceived in the liquid-absorbed state of the porous layer but the color returned to the original white state by drying. The above mode change could be repeatedly performed.

Example 6

A purple reflection type hologram sheet on which an aluminum-deposited layer had been formed was adhered to an embossed surface of a transparent polyethylene terephthalate sheet having a thickness of 25 µm to obtain a support.

A printing ink was obtained by homogeneously mixing and stirring 10 parts of a transparent metallic lustrous pigment obtained by coating the surface of a synthetic mica with titanium oxide [trade name: Ultimica BV-100, manufactured by Nihon Koken Kogyo Co., Ltd., average particle diameter: 25 µm, average thickness: 0.05 µm, reflective light: purple], 15 parts of wet-process silicic acid [trade name: Nipseal E-200A, Nihon Silica Kogyo K.K., average particle diameter: 2.5 µm], 50 parts of a urethane emulsion [trade name: Hydran AP-10, manufactured by Dainippon Ink And Chemicals, Incorporated, solid matter content: 30%], 30 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, it was applied on the above support by means of a doctor coater to provide a porous layer having a thickness of 10 µm, thereby a color-change laminate being obtained.

On the color-change laminate, a white state derived from the porous layer is visually perceived at a dry state.

When water is attached to the porous layer, the porous layer is made transparent and a luminous glittering purple hologram image is visually perceived, which is derived from the hologram of the support and the reflective light of the transparent metallic lustrous pigment in the porous layer.

The purple hologram image was visually perceived in the liquid-absorbed state of the porous layer but the color returned to the original white state by drying. The above mode change could be repeatedly performed.

Example 7

Using a screen printing ink formed by homogeneously mixing 10 parts of a bronze powder and 10 parts of a metallic lustrous pigment whose reflective light is a gold color in 80 parts of a binder resin containing an acrylic emulsion as a main component, whole-area solid printing was performed on a polyester taffeta cloth having a unit weight of 70 g/m² by means of a screen plate of 180 mesh to obtain a support having a gold metallic luster.

A printing ink was obtained by homogeneously mixing and stirring 20 parts of a transparent metallic lustrous pigment obtained by coating the surface of a synthetic mica with titanium oxide [trade name: Ultimica YD-100, manufactured by Nihon Koken Kogyo Co., Ltd., average particle diameter: 25 µm, average thickness: 0.05 µm, reflective light: gold], 10 parts of wet-process silicic acid [trade name: Nipseal E-200, manufactured by Nihon Silica Kogyo K.K., average particle diameter: 3.0 µm], 50 parts of a urethane emulsion [trade name: Hydran AP-10, manufactured by Dainippon Ink And Chemicals, Incorporated, solid matter content: 30%], 30 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, whole-area solid printing was performed on the above support by means of a screen plate of 100 mesh to provide a porous layer having a thickness of 25 µm, thereby a color-change laminate being obtained.

On the color-change laminate, a white state derived from the porous layer is visually perceived at a dry state.

When water is attached to the porous layer, the porous layer is made transparent and a highly luminous glittering gold metallic lustrous color is visually perceived, which is derived from the gold color of the support and the reflective light of the transparent metallic lustrous pigment in the porous layer.

The gold color was visually perceived in the liquid-absorbed state of the porous layer but the color returned to the original white state by drying. The above mode change could be repeatedly performed.

Example 8

A bronze powder and a metallic lustrous pigment (pearl pigment) whose reflective light is a gold color was kneaded into an ABS resin and a flat plate was formed by means of an injection molding machine to obtain a support having a gold metallic luster.

A printing ink was obtained by homogeneously mixing and stirring 15 parts of a transparent metallic lustrous pigment obtained by coating flat glass pieces with titanium oxide [trade name: Metashine MC1080RY, manufactured by Nippon Sheet Glass Co., Ltd., average particle diameter: 80 µm, average thickness: 1 µm, reflective light: gold], 15 parts of wet-process silicic acid [trade name: Nipseal E-200, Nihon Silica Kogyo K.K., average particle diameter: 3.0 µm], 50 parts of a urethane emulsion [trade name: Hydran AP-10 manufactured by Dainippon Ink And Chemicals, Incorporated, solid matter content: 30%], 40 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, whole-area solid printing was performed on the above support by means of a screen plate of 150 mesh to provide a porous layer having a thickness of 15 µm, thereby a color-change laminate being obtained.

On the color-change laminate, a white state derived from the porous layer is visually perceived at a dry state.

When water is attached to the porous layer, the porous layer is made transparent and a highly luminous gold metallic lustrous color is visually perceived, which is derived from the gold color of the support and the reflective light of the transparent metallic lustrous pigment in the porous layer.

The gold metallic lustrous color was visually perceived in the liquid-absorbed state of the porous layer but the color returned to the original white state by drying. The above mode change could be repeatedly performed.

Example 9

Using a spraying ink formed by homogeneously mixing 20 parts of a blue metallic lustrous pigment (pearl pigment) into 80 parts of a binder resin containing an acrylic resin as a main component, spray coating was performed on a black resin molded article to obtain a support having a blue metallic color.

A spraying ink was obtained by homogeneously mixing and stirring 45 parts of a transparent metallic lustrous pigment obtained by coating flat glass pieces with titanium oxide [trade name: Metashine MC5090RB, manufactured by Nippon Sheet Glass Co., Ltd., average particle diameter: 90 µm, average thickness: 5 µm, reflective light: blue], 15 parts of wet-process silicic acid [trade name: Nipseal E-1011, Nihon Silica Kogyo K.K., average particle diameter: 1.5 µm], 50 parts of a urethane emulsion [trade name: Permarine UA-150, manufactured by Sanyo Chemical Industries, Ltd., solid matter content: 30%], 30 parts of water, 20 parts of isopropyl alcohol, 0.5 part of a silicone-based defoaming agent, 3.0 parts of a leveling agent, and 3 parts of an isocyanate-based crosslinking agent.

The above spraying ink was uniformly applied on the above support to provide a porous layer having a thickness of 20 µm, thereby a color-change laminate being obtained.

On the color-change laminate, a white state derived from the porous layer is visually perceived at a dry state.

When water is attached to the porous layer, the porous layer is made transparent and a highly luminous glittering blue metallic color is visually perceived, which is derived from the blue metallic color of the support and the reflective light of the transparent metallic lustrous pigment in the porous layer.

The blue metallic color was visually perceived in the liquid-absorbed state of the porous layer but the color returned to the original white state by drying. The above mode change could be repeatedly performed.

Example 10

Using a screen printing ink formed by homogeneously mixing 10 parts of a bronze powder and 10 parts of a gold metallic lustrous pigment (pearl pigment) in 80 parts of a binder resin containing a urethane emulsion as a main component, whole-area solid printing was performed on a white polyester film having a thickness of 100 µm by means of a screen plate of 180 mesh to obtain a support having a gold metallic lustrous color.

A printing ink was obtained by homogeneously mixing and stirring 15 parts of a transparent metallic lustrous pigment obtained by coating the surface of flat glass pieces with silicon dioxide and further coating the coated product with titanium dioxide [trade name: Miraval 5420 Magic Gold, manufactured by Merck Ltd., average particle diameter: 70 µm, average thickness: 1.0 µm, reflective light: gold], 15 parts of wet-process silicic acid [trade name: Nipseal E-200, manufactured by Nihon Silica Kogyo K.K., average particle diameter: 3.0 µm], 50 parts of a urethane emulsion [trade name: Hydran AP-10, manufactured by Dainippon Ink And Chemicals, Incorporated, solid matter content: 30%], 30 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, whole-area solid printing was performed on the above support by means of a screen plate of 150 mesh to provide a porous layer having a thickness of 15 µm, thereby a color-change laminate being obtained.

On the color-change laminate, a white state derived from the porous layer is visually perceived at a dry state.

When water is attached to the porous layer, the porous layer is made transparent and a highly luminous glittering gold metallic lustrous color is visually perceived, which is derived from the gold color of the support and the reflective light of the transparent metallic lustrous pigment in the porous layer.

The gold color was visually perceived in the liquid-absorbed state of the porous layer but the color returned to the original white state by drying. The above mode change could be repeatedly performed.

Example 11

Using a screen printing ink formed by homogeneously mixing 10 parts of a bronze powder and 10 parts of a gold metallic lustrous pigment (pearl pigment) in 80 parts of a binder resin containing a urethane emulsion as a main component, whole-area solid printing was performed on a white synthetic paper having a thickness of 130 µm by means of a screen plate of 180 mesh to obtain a support having a gold metallic lustrous color.

A printing ink was obtained by homogeneously mixing and stirring 15 parts of a transparent metallic lustrous pigment formed by coating the surface of flat glass pieces with silicon dioxide and further coating the coated product with titanium dioxide [trade name: Miraval 5420 Magic Gold, manufactured by Merck Ltd., average particle diameter: 70 µm, average thickness: 1.0 µm, reflective light: gold], 15 parts of wet-process silicic acid [trade name: Nipseal E-74P, manufactured by Nihon Silica Kogyo K.K., average particle diameter: 2.5 µm], 50 parts of a urethane emulsion [trade name: Hydran AP-10, manufactured by Dainippon Ink And Chemicals, Incorporated, solid matter content: 30%], 30 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, whole-area solid printing was performed on the above support by means of a screen plate of 150 mesh to provide a porous layer having a thickness of 15 µm, thereby a color-change laminate being obtained.

On the color-change laminate, a white state derived from the porous layer is visually perceived at a dry state.

When water is attached to the porous layer, the porous layer is made transparent and a highly luminous glittering gold metallic lustrous color is visually perceived, which is derived from the gold color of the support and the reflective light of the transparent metallic lustrous pigment in the porous layer.

The gold color was visually perceived in the liquid-absorbed state of the porous layer but the color returned to the original white state by drying. The above mode change could be repeatedly performed.

Example 12

Using a screen printing ink formed by homogeneously mixing 15 parts of a metallic lustrous pigment (pearl pigment) whose reflective light is a gold color in 80 parts of a binder resin containing a urethane emulsion as a main component, whole-area solid printing was performed on a black synthetic paper having a thickness of 200 µm by means of a screen plate of 180 mesh to obtain a support having a gold metallic lustrous color.

A printing ink was obtained by homogeneously mixing and stirring 15 parts of a transparent metallic lustrous pigment formed by coating flat glass pieces with titanium oxide [trade name: Metashine MC1080RY, manufactured by Nippon Sheet Glass Co., Ltd., average particle diameter: 80 µm, average thickness: 1 µm, reflective light: gold], 15 parts of wet-process silicic acid [trade name: Nipseal E-150J, manufactured by Nihon Silica Kogyo K.K., average particle diameter: 4.0 µm], 50 parts of a urethane emulsion [trade name: Hydran AP-10, manufactured by Dainippon Ink And Chemicals, Incorporated, solid matter content: 30%], 40 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, whole-area solid printing was performed on the above support by means of a screen plate of 150 mesh to provide a porous layer having a thickness of 18 µm, thereby a color-change laminate being obtained.

On the color-change laminate, a white state derived from the porous layer is visually perceived at a dry state.

When water is attached to the porous layer, the porous layer is made transparent and a highly luminous glittering gold metallic lustrous color is visually perceived, which is derived from the gold color of the support and the reflective light of the transparent metallic lustrous pigment in the porous layer.

The gold color was visually perceived in the liquid-absorbed state of the porous layer but the color returned to the original white state by drying. The above mode change could be repeatedly performed.

Example 13

Using a screen printing ink formed by homogeneously mixing 20 parts of an aluminum fine powder in 80 parts of a binder resin containing an acrylic emulsion as a main component, whole-area solid printing was performed on a white synthetic paper having a thickness of 200 µm by means of a screen plate of 180 mesh and the whole was dried and cured to obtain a support having a silver metallic lustrous color.

A printing ink was obtained by homogeneously mixing and stirring 10 parts of a transparent metallic lustrous pigment formed by coating flat glass pieces with silicon dioxide and further coating the coated product with titanium dioxide [trade name: Miraval 5311 Scenic White, manufactured by Merck Ltd., average particle diameter: 70 µm, average thickness: 1.0 µm, reflective light: silver], 5 parts of a transparent metallic lustrous pigment formed by coating the surface of flat glass pieces with silicon dioxide and further coating the coated product with titanium dioxide [trade name: Miraval 5420 Magic Gold, manufactured by Merck Ltd., average particle diameter: 70 µm, average thickness: 1.0 µm, reflective light: gold], 10 parts of wet-process silicic acid [trade name: Nipseal E-200, manufactured by Nihon Silica Kogyo K.K., average particle diameter: 3.0 µm], 50 parts of a urethane emulsion [trade name: Hydran AP-10, manufactured by Dainippon Ink And Chemicals, Incorporated, solid matter content: 30%], 30 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, whole-area solid printing was performed on the above support by means of a screen plate of 100 mesh to provide a porous layer having a thickness of 25 µm, thereby a color-change laminate being obtained.

On the color-change laminate, a white state derived from the porous layer is visually perceived at a dry state.

When water is attached to the porous layer, the porous layer is made transparent and a highly luminous glittering silver metallic lustrous color is visually perceived, which is derived from the silver color of the support and the reflective light of the transparent metallic lustrous pigment in the porous layer.

The silver color was visually perceived in the liquid-absorbed state of the porous layer but the color returned to the original white state by drying. The above mode change could be repeatedly performed.

Example 14

A blue polyester tricot cloth composed of a fiber of 30 denier was adhered to the backside of an iridescent film having a light interference property, on which transparent films had been laminated in multi layers, to obtain a support having a blue iridescent color.

A printing ink was obtained by homogeneously mixing and stirring 20 parts of a transparent metallic lustrous pigment formed by coating the surface of flat glass pieces with silicon dioxide and further coating the coated product with titanium dioxide [trade name: Miraval 5425 Magic blue, manufactured by Merck Ltd., average particle diameter: 70 μm, average thickness: 1.0 μm, reflective light: blue], 15 parts of wet-process silicic acid [trade name: Nipseal E-200, manufactured by Nihon Silica Kogyo K.K., average particle diameter: 3.0 μm], 50 parts of a urethane emulsion [trade name: Hydran AP-10, manufactured by Dainippon Ink And Chemicals, Incorporated, solid matter content: 30%], 30 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, whole-area solid printing was performed on the above support by means of a screen plate of 180 mesh to provide a porous layer having a thickness of 10 μm, thereby a color-change laminate being obtained.

On the color-change laminate, a white state derived from the porous layer is visually perceived at a dry state.

When water is attached to the porous layer, the porous layer is made transparent and a blue metallic lustrous color having a glittering brilliant property and an iridescent property is visually perceived, which is derived from the blue iridescent color of the support and the reflective light of the transparent metallic lustrous pigment in the porous layer.

The blue metallic lustrous color was visually perceived in the liquid-absorbed state of the porous layer but the color returned to the original white state by drying. The above mode change could be repeatedly performed.

Example 15

Using a screen printing ink formed by homogeneously mixing 10 parts of a purple transparent metallic lustrous pigment in 90 parts of a binder resin containing an acrylic emulsion as a main component, whole-area solid printing was performed on a black synthetic paper having a thickness of 200 μm by means of a screen plate of 180 mesh to obtain a support having a purple metallic lustrous color.

A printing ink was obtained by homogeneously mixing and stirring 5 parts of a transparent metallic lustrous pigment having a color flopping property and formed by coating flake-like silicon oxide with tin oxide and further coating the coated product with titanium oxide [trade name: Colorstream T10-01 (Viola Fantasy), manufactured by Merck Ltd., average particle diameter: 20 μm, average thickness: 0.5 μm], 15 parts of wet-process silicic acid [trade name: Nipseal E200, manufactured by Nihon Silica Kogyo K.K., average particle diameter: 3.0 μm], 30 parts of a urethane emulsion [trade name: Hydran HW-930, manufactured by Dainippon Ink And Chemicals, Incorporated, solid matter content: 50%], 40 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, whole-area solid printing was performed on the above support by means of a screen plate of 180 mesh to provide a porous layer having a thickness of 10 μm, thereby a color-change laminate being obtained.

On the color-change laminate, a white state derived from the porous layer is visually perceived at a dry state.

When water is attached to the porous layer, the porous layer is made transparent and a glittering gold, silver, green, or purple metallic lustrous color is visually perceived depending on the angle from which the color is visually perceived, the color being derived from the purple metallic lustrous color of the support and the reflective light of the transparent metallic lustrous pigment in the porous layer.

The gold, silver, green, or purple metallic lustrous color was visually perceived in the liquid-absorbed state of the porous layer but the color returned to the original white state by drying. The above mode change could be repeatedly performed.

Example 16

Using a screen printing ink formed by homogeneously mixing 10 parts of a blue transparent metallic lustrous pigment in 90 parts of a binder resin containing an acrylic emulsion as a main component, whole-area solid printing was performed on a black synthetic paper having a thickness of 200 μm by means of a screen plate of 180 mesh to obtain a support having a blue metallic lustrous color.

A printing ink was obtained by homogeneously mixing and stirring 10 parts of a cholesteric liquid crystal-type transparent metallic lustrous pigment as a transparent metallic lustrous pigment having a color flopping property [trade name: Helicone HC (Scarabeus, SLM90120), manufactured by Wacker Chemie, average particle diameter: 30 μm, average thickness: 5 μm], 15 parts of wet-process silicic acid [trade name: Nipseal E-200, manufactured by Nihon Silica Kogyo K.K., average particle diameter: 3.0 μm], 50 parts of a urethane emulsion [trade name: Hydran AP-10, manufactured by Dainippon Ink And Chemicals, Incorporated, solid matter content: 30%], 30 parts of water, 0.5 part of a silicone-based defoaming agent, 3 parts of a thickening agent for aqueous ink, 1 part of ethylene glycol, and 2 parts of an isocyanate-based crosslinking agent.

Using the above printing ink, whole-area solid printing was performed on the above support by means of a screen plate of 180 mesh to provide a porous layer having a thickness of 10 μm, thereby a color-change laminate being obtained.

On the color-change laminate, a white state derived from the porous layer is visually perceived at a dry state.

When water is attached to the porous layer, the porous layer is made transparent and a glittering green metallic lustrous color or blue metallic lustrous color is visually perceived depending on the angle from which the color is visually perceived, the color being derived from the blue metallic lustrous color of the support and the reflective light of the transparent metallic lustrous pigment in the porous layer.

The green or blue metallic lustrous color was visually perceived in the liquid-absorbed state of the porous layer but the color returned to the original white state by drying. The above mode change could be repeatedly performed.

Application Example 1

Using a pen containing water in the shaft tube as an attaching tool of water, letters "ABC" were written on the color-change laminate prepared in Example 1.

The portion of the porous layer on which the letters were written by the pen was made transparent by the liquid absorption, and glittering highly luminous gold letters "ABC" could be clearly visually perceived, which were derived from the gold color of the support and the reflective light of the transparent metallic lustrous pigment in the porous layer.

The gold letters were visually perceived in the liquid-absorbed state but the color returned to the original white state by drying. The above mode change could be repeatedly performed.

Application Example 2

The color-change laminate prepared in Example 7 was cut into a size of 70 cm×70 cm and a waterproof sheet composed of a polyolefin resin was adhered to the backside to obtain an allochroic sheet.

Using a pen containing water, symbols "○△□" were written on the porous layer of the allochroic sheet.

The portion of the porous layer on which the symbols were written by the pen was made transparent by the liquid absorption, and glittering highly luminous gold symbols "○△□" could be clearly visually perceived, which were derived from the gold color of the support and the reflective light of the transparent metallic lustrous pigment in the porous layer.

The gold symbols were visually perceived in the liquid-absorbed state but the color returned to the original white state by drying. The above mode change could be repeatedly performed.

Application Example 3

A nonwoven fabric made of cellulose (unit weight: 40 g/m$^2$, 150 mm×200 mm) was impregnated with a liquid composition composed of 40 parts of polyethylene glycol [trade name: PEG#6000P, manufactured by Sanyo Chemical Industries, Ltd.] and 60 parts of water to prepare a liquid-absorbed article.

After the liquid-absorbed article was evenly pressed against the palm of a little child's hand to attach the liquid composition thereto, the hand was pressed on the porous layer of the color-change laminate prepared in Example 1 for about 5 seconds. Thereupon, the liquid composition was absorbed in the porous layer and the layer was made transparent. Thus, a glittering highly luminous gold handprint was taken, which were derived from the gold color of the support and the reflective light of the transparent metallic lustrous pigment in the porous layer.

The color-change laminate on which the handprint had been formed was allowed to stand under an environment of 20° C. for 3 months but the gold handprint having a brilliant property the same as the initial one was maintained and thus the laminate was excellent in storage stability.

While the invention has been described in detail and with reference to specific embodiments thereof, it will be apparent to one skilled in the art that various changes and modifications can be made therein without departing from the scope thereof.

This application is based on Japanese patent application No. 2007-324134 filed on Dec. 17, 2007, Japanese patent application No. 2008-294109 filed on Nov. 18, 2008, the entire contents thereof being hereby incorporated by reference.

What is claimed is:

1. A color-change laminate comprising:
   A) a support having a metallic lustrous property; and
   B) a porous layer provided on the surface of the support, wherein the porous layer comprises
      x) a low-refractive-index pigment and
      y1) a transparent metallic lustrous pigment formed by coating a transparent core material with a metal oxide and/or
      y2) a transparent metallic lustrous pigment having a color-flopping property
      wherein x, y1 and/or y2 are all fixed onto a binder resin in a dispersed state
   wherein the average particle diameter a of the y1) and y2) transparent metallic lustrous pigment and the thickness b of the porous layer satisfy the following expression (1):

$$a \geq \sqrt{2}b \tag{1}$$

and wherein the porous layer is different in transparency in a liquid-absorbed state and in a liquid-unabsorbed state.

2. The color-change laminate according to claim 1, wherein y1) the transparent metallic lustrous pigment formed by coating a transparent core material with a metal oxide is a transparent metallic lustrous pigment formed by coating a transparent core material selected from natural mica, synthetic mica, glass, and alumina with a metal oxide and y2) the transparent metallic lustrous pigment having a color-flopping property is selected from cholesteric liquid crystal-type transparent metallic lustrous pigments and transparent metallic lustrous pigments formed by coating silicon oxide with one or more metal oxides.

3. The color-change laminate according to claim 1, wherein the average particle diameter of the y1) and y2) transparent metallic lustrous pigment is 1 μm to 300 μm.

4. The color-change laminate according to claim 1, wherein the average particle diameter of the low-refractive-index pigment is 0.03 μm to 5 μm.

5. The color-change laminate according to claim 1, wherein the mass ratio of the low-refractive-index pigment to the y1) and y2) transparent metallic lustrous pigment(s) in the porous layer is 1:0.2 to 1:3.

6. The color-change laminate according to claim 1, wherein the thickness of the porous layer is 5 μm to 30 μm.

7. The color-change laminate according to claim 1, wherein the average thickness of the y1) and y2) transparent metallic lustrous pigment is 0.01 μm to 5 μm.

8. The color-change laminate according to claim 1, wherein the metallic lustrous color of the support is gold and the color of the reflective light of the y1 transparent metallic lustrous pigment formed by coating a transparent core material with a metal oxide is gold.

9. The color-change laminate according to claim 1, wherein the metallic lustrous color of the support is silver and the color of the reflective light of the y1 transparent metallic lustrous pigment formed by coating a transparent core material with a metal oxide is gold or silver.

* * * * *